Patented May 16, 1939

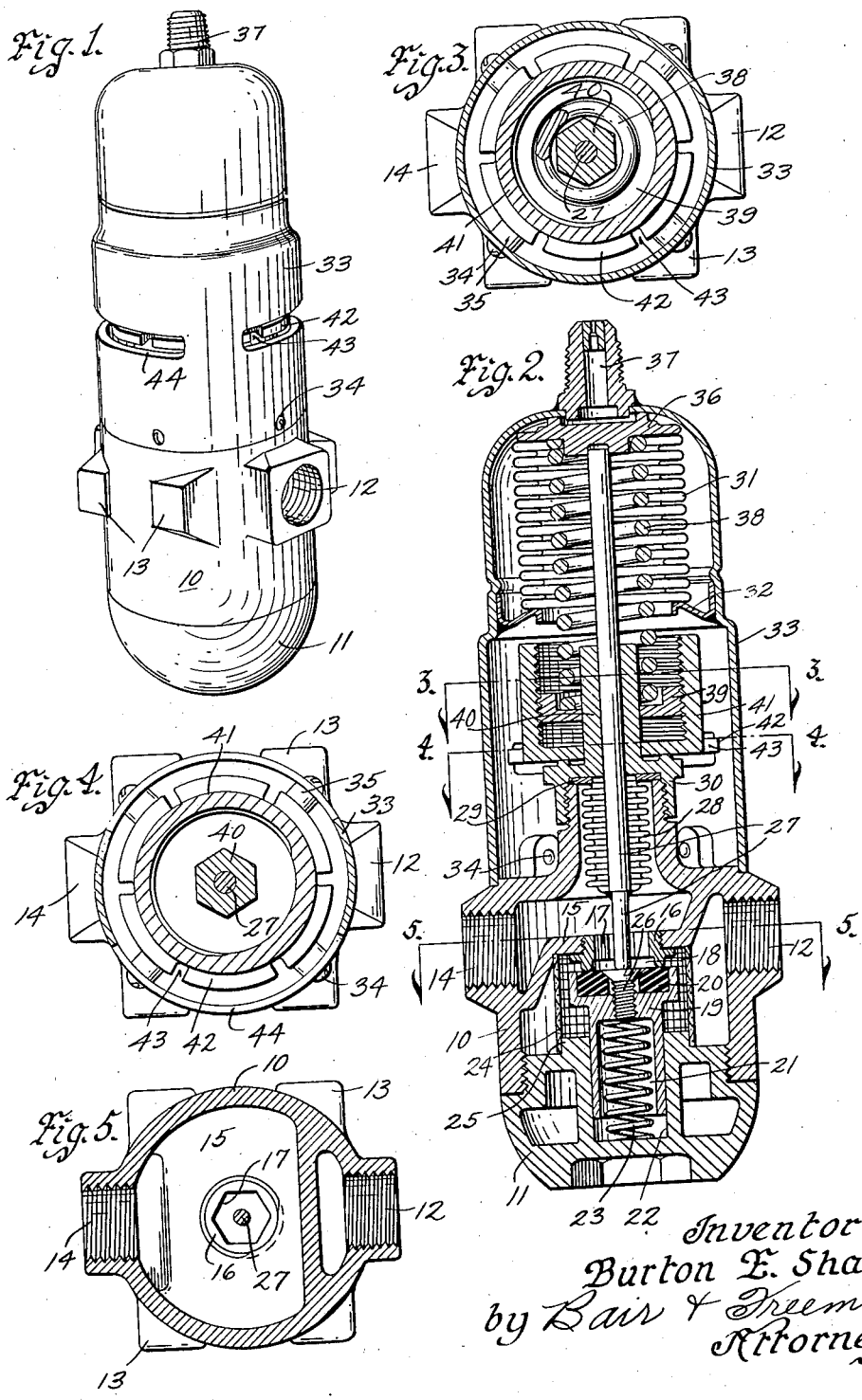

2,158,436

UNITED STATES PATENT OFFICE 2,158,436

WATER VALVE

Burton E. Shaw, Goshen, Ind., assignor to Penn Electric Switch Co., Goshen, Ind., a corporation of Iowa Application September 23, 1937, Serial No. 165,353

8 Claims. (Cl. 137—153)

An object of my invention is to provide a water valve of inexpensive construction especially adapted for regulating the flow of cooling water to a condenser coil of a refrigerating system such as disclosed in the Henning Patent No. 2,011,220, of August 13, 1935.

A further object of my invention is to provide a valve which has an improved mounting for the pressure operated bellows of the valve, which mounting entirely encloses the bellows and also the adjusting mechanism for the bellows, thus eliminating the necessity of any intermediate bracket between the bellows and the body of the valve for connecting the two together.

Another object is to provide a valve in which the adjusting arrangement is such that a rotatable adjusting sleeve need not move longitudinally of the valve housing, and accordingly a hollow shell may be provided for enclosing the adjusting mechanism and forming a housing for the bellows and it is merely necessary to provide a slot in the periphery thereof through which access may be had to the adjusting sleeve.

A further object is to provide the valve body with a removable valve seat member which may be readily removed for repair or renewal, the valve body having a removable portion for gaining access thereto.

A further object is to provide a removable and replaceable strainer and also a valve plug which is readily removable and replaceable when the removable part of the valve body is disassociated from the valve body.

Still a further improved feature of my invention is to provide a dash pot arrangement for the valve plug which prevents hammer knock in the pipes, prevents vibration due to closing of the valve and insures proper guiding of the valve with respect to the valve seat.

With these and other objects in view, my invention consists in the construction, arrangement and combination of the various parts of my water valve, whereby the objects contemplated are attained as hereinafter more fully set forth, pointed out in my claims and illustrated in the accompanying drawing, in which:

Figure 1 is a perspective view of a water valve embodying my invention.

Figure 2 is a vertical sectional view therethrough showing the valve on a slightly enlarged scale; and Figures 3, 4 and 5 are horizontal sectional views on the lines 3—3, 4—4 and 5—5, respectively, of Figure 2.

On the accompanying drawing I have used the reference numeral 10 to indicate a valve body. The valve body 10 has a removable part 11 which is screw-threadedly associated therewith and may be properly gasketed relative thereto. The valve body 10 has an inlet 12 and an outlet 14 for connection in a water line or the like. Lugs 13 are formed on the valve body 10 for engagement with a wrench when installing or removing the valve relative to a pipe line.

The valve body 10 has a partition wall 15 provided with a central screw-threaded aperture. A valve seat member 16 is adapted to be screwed into the aperture of the partition wall 15. Suitable means is provided for removing the member 16 from the wall 15. By way of illustration, the member 16 has a bore 17 which is other-than-round in shape, it being shown as a hexagon on the drawing. This bore is adapted to receive a hexagon-shaped rod serving as a tool for rotating and thus installing or removing the valve seat member 16 relative to the partition 15 when the removable part 11 of the valve body 10 is disassociated from the valve body.

The valve seat member 16 is provided with an annular bead or seat 18. A valve plug 19 is adapted to normally seat thereagainst. The valve plug includes an insert 20 of suitable composition for contacting and sealing against the bead 18.

The valve plug 19 has a tubular portion 21 extending slidably into a bore or socket 22 of the valve body part 11. The tubular part 21 is a working fit in the bore, the parts cooperating to form a guide to prevent any undesired canting of the valve plug. The bore 12 receiving the sleeve 21 acts as a dash pot, preventing sudden movements of the valve especially during the initial opening thereof. Accordingly the sleeve 21 fits in the bore 22 with a few thousandths of an inch clearance. The valve plug 19 is normally retained seated by a spring 23. The spring 23 is received in the bore 22 and in the bore of the sleeve 21.

To prevent dirt or the like from getting into the valve seat, I provide a tubular strainer screen 24. The screen 24 is received on a reduced extension 25 of the valve body part 11 which serves to properly align the screen when assembling the valve body. Obviously the screen 24 is removable from the valve body when the portion 11 is removed therefrom thus facilitating cleaning or replacement of the screen.

A screw 26 is provided for retaining the insert 20 in position relative to the plug 19. The plug 19 is adapted to be unseated by a stem 27 engaging the screw 26 and pressing downwardly on it against the tension of the spring 23. The stem 27 is sealed relative to the valve body 10 by a bellows 28, the lower end of which is soldered or brazed to the stem and the upper end of which is soldered or brazed to a washer 29. The washer 29 is retained in position and sealed relative to the valve body 10 by a retainer nut 30.

For actuating the stem 27 I provide a bellows 31. The bellows 31 has its lower end sealed relative to a ring 32. The ring 32 is mounted in and sealed relative to a shell 33. The shell 33 is preferably a deep drawn stamping and serves the double purpose of a housing for the bellows 31 and a mounting for the bellows without the necessity of providing an intermediate bracket for mounting a bellows housing on a valve body. The shell 33 is retained in position relative to the valve body 10 by a plurality of cap screws 34, extending into lugs 35 of the valve body. The bellows 31 has an operating head 36 sealed to its upper end. A pressure connection 37 to the shell 33 permits the introduction of pressure, such as the pressure of refrigerant to the shell for the purpose of collapsing the bellows 31 and thereby opening the valve.

For normally retaining the bellows head 36 in raised position, I provide a spring 38. The tension of the spring 38 and thereby the range of operation of the valve may be adjusted by means of an adjusting member 39. The adjusting member 39 is slidably and non-rotatably mounted on a hexagon shaped extension 40 of the retainer nut 30 of the valve. For imparting longitudinal movement to the adjusting member 39 and thereby retaining the tension of the spring, I provide an adjusting sleeve 41 seating against the nut 30. The sleeve 41 is internally screw-threaded and its threads coact with the adjusting member 39. Thus the sleeve 41 is positioned so that it is non-floating.

Around the periphery of the sleeve 41 I provide a flange 42. The flange 42 has notches, as indicated at 43, to receive a screw driver or spanner wrench whereby the sleeve 41 may be rotatably adjusted. For gaining access to the notches 43, I provide a pair of relatively narrow slots 44 in the shell 33. These are best shown in Figure 1. Since the sleeve 41 is non-floating during adjustment, the flange 42 can always be engaged by the adjusting tool in any position of adjustment of the adjusting member 39 and with a comparatively narrow slot 44 in the shell 33. Due to this construction I am able to enclose the bellows and the adjusting mechanism therefor in a neat appearing housing, thus entirely enclosing the operating parts of the valve. The shell 33 serves the double purpose of a housing for the bellows and a mounting therefor. The spring is enclosed by the bellows and the shell.

The valve seat member 16 and the valve plug are both readily removable and replaceable. The screen or strainer 24 is readily removable for either cleaning or replacement. Also this construction lends itself well to the provision of a dash pot arrangement which prevents vibration of the piping connected with the valve. This permits adjustment of the valve to a closer differential of operation, as the usual chattering experienced with some types of valves, is eliminated in my construction due to the effective guiding of the valve plug by the bore 22 of the removable portion 11 of the valve body. The constructional features thus contribute to a number of advantages from a commercial and operating standpoint.

Some changes may be made in the construction and arrangement of the parts of my device without departing from the real spirit and purpose of my invention and it is my intention to cover by my claims any modified forms of structure or use of mechanical equivalents which may be reasonably included within their scope.

I claim as my invention:

1. In a water valve, a valve body having an intake and an outlet, a valve seat in said valve body, a valve plug normally seated against said valve seat and means for unseating said valve plug including a hollow shell, the outer end of said shell forming a bellows chamber, a bellows therein, a pressure connection to said bellows, an adjusting spring in said bellows, a valve plug stem extending from said valve body through said shell and into said bellows and actuated by movement thereof and adjusting means for said spring and located in said shell between said bellows and valve body, said adjusting means including a rotatable and nonslidable adjusting member and a slidable and non-rotatable spring engaging member threadedly connected thereto for adjusting the tension of said spring upon rotation of said adjusting member, said hollow shell having a circumferential slot therein through which access to said adjusting member may be had for rotating it.

2. In a water valve, a valve body, a valve seat in said valve body, a valve plug for seating against said valve seat and means for unseating said valve plug including a hollow shell, the outer end of said shell forming a bellows chamber, a bellows therein, an adjusting spring in said bellows, a valve plug stem extending from said valve body through said shell and into said bellows and actuated by movement thereof and adjusting means for said spring located in said shell between said bellows and body, said adjusting means including a rotatable and nonslidable adjusting sleeve internally threaded, said hollow shell having a slot through which said sleeve may be engaged for rotation thereof, an externally threaded adjusting member in said sleeve having an other-than-round central aperture and an extension on said valve body fitting said aperture to prevent rotation of said adjusting member upon rotation of said sleeve.

3. In a water valve, a valve structure and means for operating said valve structure including a hollow shell having an open end connected with said valve structure, the outer end of said shell forming a bellows chamber, a bellows therein and operatively connected with said valve structure, a pressure connection to said bellows, an adjusting spring for said bellows, and adjusting means for said spring located in said shell, said adjusting means including a rotatable and nonslidable adjusting sleeve internally threaded, an externally threaded adjusting member in said sleeve and having an other-than-round central aperture and an elongated extension from said valve structure fitting said aperture to prevent rotation of said adjusting member upon rotation of said sleeve.

4. In a water valve, a valve body having an intake and an outlet, a valve seat in said valve body, a valve plug normally seated against said valve seat and means for unseating said valve plug including a hollow shell, the outer end of said shell forming a bellows chamber, a bellows therein, a pressure connection to said bellows, an adjusting spring in said bellows, a valve plug stem extending from said valve body through said shell and unto said bellows and actuated by movement thereof and adjusting means for said spring located in said shell between said bellows and body, said adjusting means including a rotary adjusting member, means for preventing movement thereof longitudinally of said hollow shell during rotating adjusting thereof and means for permitting access through the wall of said hollow shell to said adjusting member for imparting rotation thereto comprising a slot in the wall of said shell extending partially around the periphery thereof.

5. In a water valve, a valve body having an intake and an outlet, a valve seat in said valve body, a valve plug for seating against said valve seat and means for unseating said valve plug including a hollow shell connected with and extending from said valve body, the outer end of said shell forming a bellows chamber, a bellows therein, a pressure connection to said bellows, an adjusting spring for said bellows, a valve plug stem extending from said valve body through said shell and actuated by movement of said bellows and adjusting means for said spring located in said shell, said adjusting means including a rotatable and non-slidable adjusting member and a slidable and non-rotatable spring engaging member threadedly connected therewith for adjusting the tension of said spring upon rotation of said adjusting member, said hollow shell having an opening therein through which access to said adjusting member may be had for rotating it.

6. In a water valve, a valve structure, an extension therefrom, a bellows therein, means for supporting said bellows on said valve structure, an adjusting spring for said bellows, an actuating stem extending from said valve structure, through said extension and operatively connected with said bellows for movement thereby and adjusting means for said spring including an adjusting member for adjusting the tension of said spring upon rotation of said adjusting member, said adjusting member being seated against said valve structure in a position surrounding said extension, said extension having an other-than-round contour and a spring follower threaded relative to said adjusting member and having an other-than-round aperture receiving said extension.

7. In a water valve, a valve structure, a hollow shell, the outer end of said shell forming a bellows chamber, a bellows therein, an adjusting spring for said bellows, a valve operating stem extending from said valve structure to said bellows and actuated by movement thereof and adjusting means for said spring located in said shell between said bellows and valve structure, said adjusting means including a threaded and non-slidable adjusting member, a second threaded adjusting member, the threads of said adjusting members coacting with each other, said second adjusting member having other-than-round portions and an extension on said valve structure fitting said portion to prevent rotation of said second adjusting member upon rotation of said first adjusting member.

8. In a water valve, a valve structure and means for operating said valve structure including a bellows supported in spaced relation to said valve structure and operatively connected therewith, a pressure connection to said bellows, an adjusting spring for said bellows and adjusting means for said spring including a rotatable and non-slidable adjusting sleeve internally threaded and an externally threaded adjusting member in said sleeve and having an other-than-round central aperture and an elongated extension from said valve structure fitting said aperture to prevent rotation of said adjusting member upon rotation of said sleeve.

BURTON E. SHAW.